United States Patent [19]
Hutchinson

[11] 4,057,964
[45] Nov. 15, 1977

[54] WORKING FLUIDS AND SYSTEMS FOR RECOVERING GEOTHERMAL OR WASTE HEAT

[75] Inventor: Arthur J. L. Hutchinson, Pasadena, Calif.

[73] Assignee: Geothermal Investment Co., South Pasadena, Calif.

[21] Appl. No.: 717,096

[22] Filed: Aug. 24, 1976

Related U.S. Application Data

[63] Continuation-in-part of Ser. No. 565,942, April 7, 1975, abandoned, which is a continuation of Ser. No. 449,220, March 8, 1974, abandoned, which is a continuation-in-part of Ser. No. 301,056, Oct. 26, 1972, abandoned, which is a continuation-in-part of Ser. No. 195,154, Nov. 3, 1971, abandoned.

[51] Int. Cl.² ............................................. F03G 7/00
[52] U.S. Cl. ........................................ 60/641; 165/45
[58] Field of Search ........................... 60/641; 165/45

[56] References Cited

U.S. PATENT DOCUMENTS

| 3,274,769 | 9/1966 | Reynolds | 60/641 |
| 3,470,943 | 10/1969 | Van Huisen | 60/641 |
| 3,605,403 | 9/1971 | Aikawa | 60/641 |

Primary Examiner—Allen M. Ostrager
Attorney, Agent, or Firm—Christie, Parker & Hale

[57] ABSTRACT

Energy is efficiently extracted from geothermal wells by flashing a portion of the hot fluid from the well into steam and using the steam and the hot fluid to heat an operating fluid in a closed system wherein the temperature and pressure are such that the operating fluid vaporizes and the fluid has sufficient superheat to avoid condensation when expanded in a prime mover such as a gas expansion gas turbine that has at least 75% conversion efficiency. Additionally, the operating fluid as a vapor has a specific heat that is at least 50% of the specific heat of the operating fluid as a liquid over the temperature range of 100° F. to 250° F. under the operating pressures of the process. Instead of using the steam to heat an operating fluid, it may be applied directly to a steam turbine. Additionally the steam may be washed before application to the turbine.

6 Claims, 8 Drawing Figures

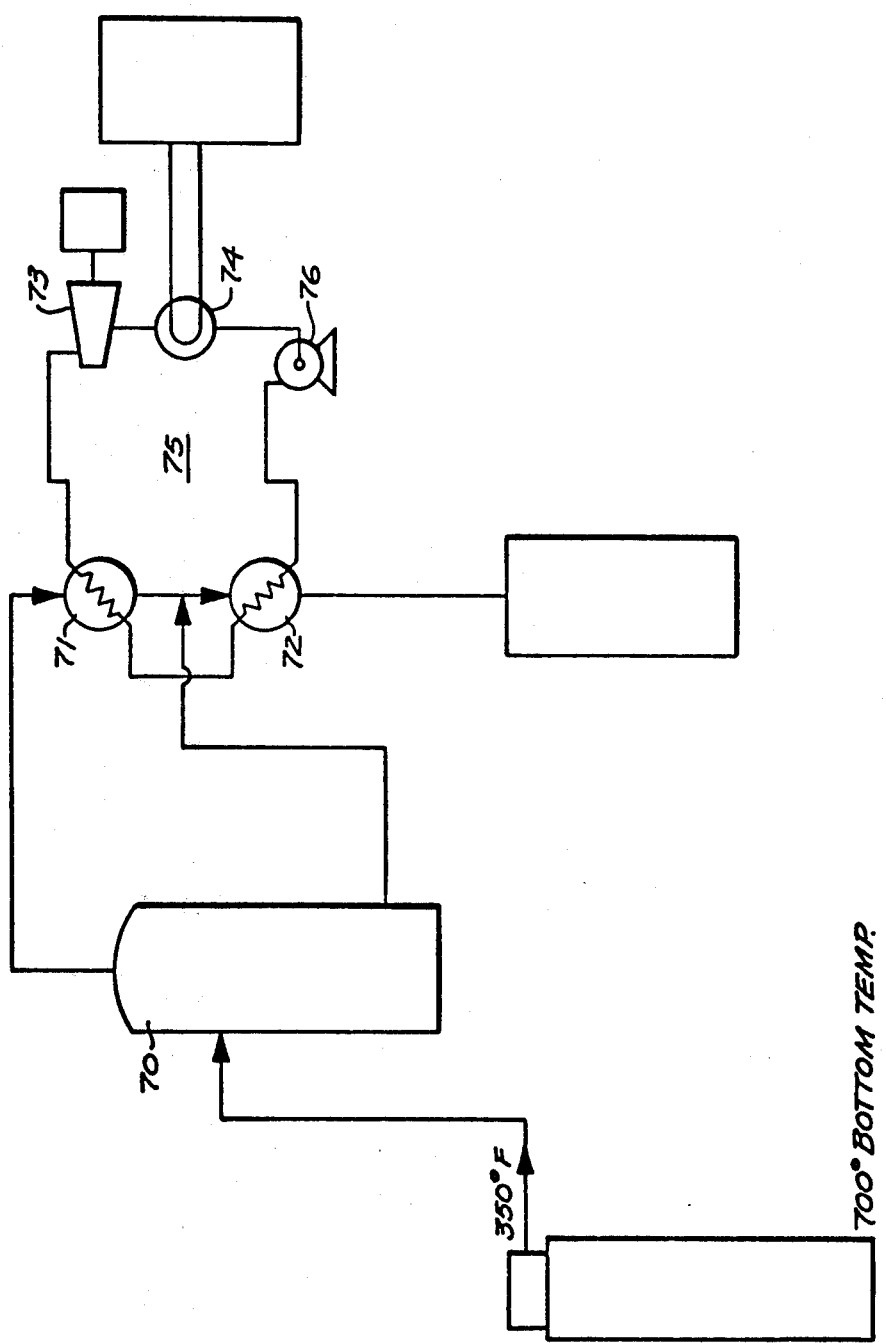

4,057,964

WORKING FLUIDS AND SYSTEMS FOR RECOVERING GEOTHERMAL OR WASTE HEAT

CROSS REFERENCE TO RELATED APPLICATIONS

This application is a continuation-in-part of my application Ser. No. 565,942, filed Apr. 7, 1975 now abandoned, which is a continuation of application Ser. No. 449,220, filed Mar. 8, 1974 (now abandoned), which is a continuation-in-part of application Ser. No. 301,056, filed Oct. 26, 1972 (now abandoned), which is a continuation-in-part of application Ser. No. 195,154, filed Nov. 3, 1971 (now abandoned).

BACKGROUND OF THE INVENTION

1. Field of the Invention

This invention relates to the extraction of useful energy from hot fluids and more particularly to the production of power by using selected operating fluids or working fluids which may be heated by hot fluid extracted from a geothermal well or other sources having heat in the same temperature range as fluids from a geothermal well.

2. Description of the Prior Art

Mechanical and electrical energy have been generated in many different ways with many different sources of primary energy. Water, for example, has often been used as a primary source of energy for the generation of power. Fresh water retained behind a dam has been selectively passed through turbines that drive generators for the generation of electricity. However, this generally requires a large body of water behind a relatively expensive dam with the water covering many acres of valuable land. Additionally, the large body of water represents a potentially destructive force in event of dam breakage or flooding.

Sea water may also be employed in the generation of power. For example, the relatively warm water at the ocean's surface may be employed to vaporize an operating fluid that has a superatmospheric vapor pressure at the temperature of the water at the ocean's surface. This fluid may then be expanded in a power extracting gas expansion device for the generation of power. This operation employing sea water to heat a working fluid must necessarily take place at relatively low temperatures, since the sea water seldom gets over 80° F, and at low pressures and consequently is relatively inefficient. Additionally, where sea water is employed in condensing the operating fluid it must be brought from deep below the surface to have a sufficient temperature difference between the heating water at the surface and the cooling water. Moreover, many special conditions must exist for sufficient efficiency to make this process worthwhile. For example, where the operating fluid is vaporized with surface water and condensed with below surface water, one or both of the operations must be carried out at a pressure which is close to the pressure of the water being used for that operation. This is generally accomplished by submerging either the boiler or the condenser or both to a depth in a body of water at which the water pressure approximates the vapor pressure of the operating fluid in the respective piece of equipment. In one known example, it is recommended that the equipment be submerged to a depth of over 270 feet. The required equipment is both large and expensive.

Water, however, is an attractive carrier of energy because less pollution generally results from water power generation processes than from coal or oil powered processes, for example.

It is known that the interior of the earth is a molten mass of rocks and is very hot. This geothermal heat energy may advantageously and efficiently be employed as a primary source of energy for the generation of power through water as a carrier. The water may appear as steam released from volcanic areas or hot water which is present in volcanic areas and in deep alluvial deposits that are porous enough to permit percolation of water to the deep hot zones. This water may have a temperature as high as 700° F at a depth of 5,000 feet. In areas where steam alone is produced, the steam may be used directly in turbines to generate electricity. Where there is a mixture, the steam may be separated in a flash chamber and then used in a steam turbine. However, the steam and the hot water generally contain corrosive materials that can cause destruction of the critical and expensive parts of the rotating machinery employed to convert the energy of the steam and hot water into mechanical or electrical energy.

SUMMARY OF THE INVENTION

Rather than employing the hot fluid, which may be water and steam containing possibly a substantial amount of salts and dissolved minerals, from the geothermal wells directly, the heat from the hot fluid in accordance with this invention is transferred to a non-corrosive, low boiling point material, which functions as a working fluid or operating fluid in the system. The steam is also employed to heat the operating fluid or is applied directly to a steam turbine, after being washed. The process for power generation in which heat in a hot fluid is recovered comprises the steps of passing the hot fluid through one or more heat exchangers in heat exchange relationship with an operating fluid having a boiling point at the operating pressures below the temperature of the hot fluid to vaporize the operating fluid at a first pressure and to give the fluid sufficient superheat to avoid condensation in a prime mover having at least 75% conversion efficiency. Advantageously, the operating fluid as a vapor has a specific heat that is at least 50% of the specific heat of the operating fluid as a liquid over the same temperature range at the output of the prime mover, which is between 100° F and 250° F under the operating pressures of the process. The operating fluid is condensable at a second pressure below the first pressure at temperatures producible by water from a cooling tower operating in the atmosphere.

The process further comprises the steps of expanding the vapor in a power extracting gas expansion device, such as a turbine, and condensing the vapor after power extraction. The steps are repeated in a continuous process. The operating fluid may be a pure substance or a mixture of substances which has the advantage over a pure substance of more efficient condensation and resultant lower cost equipment. Additionally, more power may be generated with a mixture as the operating fluid.

The operating fluid is advantageously contained in a closed system comprising heat exchangers for converting the operating fluid to a vapor with sufficient superheat to avoid condensation in a prime mover having at least 75% conversion efficiency with the operating fluid as a vapor having a specific heat that is at least 50% of the specific heat of the operating fluid as a liquid over the same temperature range under the operating pressures of the process. The system also includes a power extracting gas expansion device for extracting power from the vaporized operating fluid upon expansion of the vapor and a condenser coupled to the output of the expansion device for condensing the vapor, and a pump for circulating the operating fluid in the closed system.

The geothermal fluid is passed through a flash chamber and the resultant steam is applied to a heat exchanger for adding heat to the operating fluid or to a steam turbine. The steam is advantageously washed before being used.

BRIEF DESCRIPTION OF THE DRAWING

The above and other features and advantages of the present invention may be understood more clearly and fully upon consideration of the following specification and drawing, in which:

FIGS. 7 and 8 are process flow diagrams of alternate embodiments of the invention employing steam in a steam turbine and steam in a heat exchanger separate from the hot fluid after flash.

DESCRIPTION OF THE PREFERRED EMBODIMENTS

Geothermal heat may be efficiently converted to mechanical energy and finally electrical energy in accordance with this invention by using the combination of hot water and steam from geothermal walls to superheat an operating fluid to a temperature to avoid condensation in a prime mover having at least 75% conversion efficiency.

There are many areas where hot water can be recovered from a geothermal well at a temperature up to approximately 450° F or higher. In some areas, the hot water or brine will flow naturally to the surface while in others, pumping must be resorted to. In any event, the heat in the hot water can be recovered in accordance with this invention for the production of power. By transferring heat from hot waters, brines, and/or steam to a low boiling material to above its critical temperature, such as isobutane heated to about 320° F and expanding the vapors so produced through a prime mover, a large amount of the heat may be converted to useful power. The low boiling material exhausting from the prime mover can be condensed and passed in heat exchange relationship with the fluid at the output of the prime mover to recover some of the heat remaining in the fluid after expansion. The fluid is recycled in the system. The hot water or brine, at a temperature from approximately 130° F to 200° F can then be passed into the earth or, alternatively, treated to recover valuable dissolved minerals.

Figure 1:
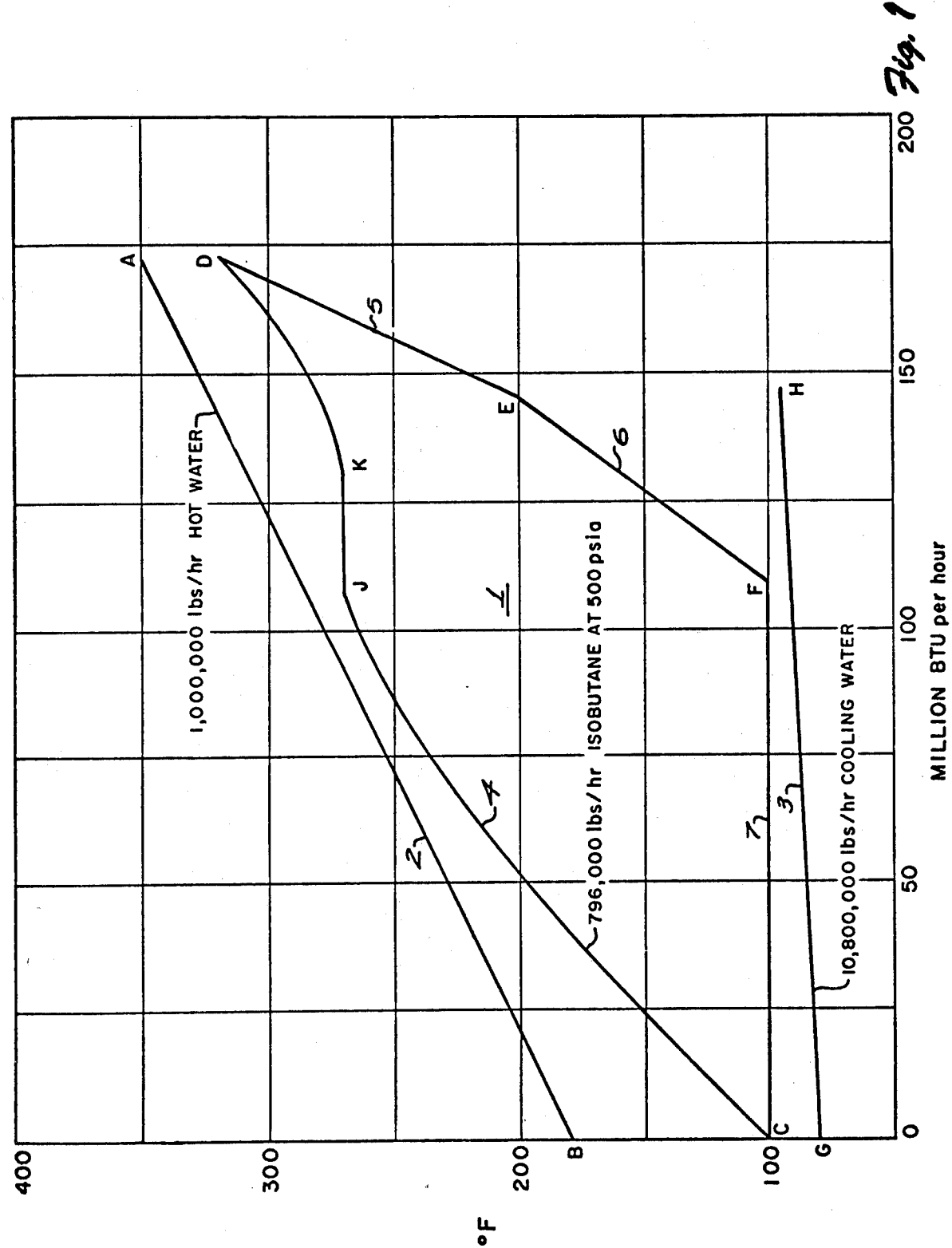
FIG. 1 is a temperature-enthalpy diagram for a heating fluid, an operating fluid having sufficient superheat to avoid condensation in a prime mover having at least 75% conversion efficiency and a specific heat as a vapor that is at least 50% of the specific heat as a liquid over the same temperature range under the operating pressures of the process, and a cooling fluid of the heat recovery system in accordance with the present invention.

FIG. 1 is a temperature-enthalpy diagram with temperature in degrees Fahrenheit and enthalpy in million BTU's per hour, for a typical heat recovery system employing isobutane as the exemplary operating fluid at selected temperatures and pressures and with a selected amount of superheat. Water is used as the exemplary heating and cooling fluid. Operating fluids that may be employed in the process are limited to those that have a boiling point below that of water and a critical temperature below the input temperature of the heating fluid and those that are capable of being superheated in one or more heat exchangers from a heating fluid that has a temperature no higher than the highest temperature at which water from a geothermal well reaches the surface and is useful.

FIG. 1 includes a heat cycle curve 1 for the low boiling point operating fluid, such as isobutane. FIG. 1 also includes a curve 2 for the heating fluid and a curve 3 for the cooling fluid. As an illustrative example with the resultant curves of FIG. 1, the hot water from a geothermal well has an initial temperature of 350° F, a flow rate of 1,000,000 pounds per hour and heats 796,000 pounds per hour of isobutane operating at a pressure of 500 psia.

The operating fluid is vaporized by passing it in heat exchange relationship with the heating fluid, is expanded in a power extracting gas expansion device, is condensed to a liquid, and pumped and recirculated in the closed system. The heat cycle 1 for the operating fluid has several phases or steps. As the operating fluid is heated it passes from a temperature of 100° F to a temperature of 270° F along curve 4 from point C to point J. Between points J and K on curve 4 the fluid is heated at a constant temperature of 270° F during the latent heat of vaporization step. The fluid is further heated to point D to a temperature of 320° F having a superheat represented by the curve 4 from points K to D. The superheat of the single substance operating fluid is sufficient to avoid condensation in a prime mover having at least 75% conversion efficiency. Curve 5 between points D and E shows the drop in heat content and temperature of the vapor passing through the prime mover or power extracting gas expansion device, such as a turbine. The pressure of the system changes from 500 psia at the input of the turbine to 72 psia at the output of the turbine. The lower pressure is dictated by the turbine employed and the output conditions. It is desirable to have this as low as possible for the greatest extraction of power. Curve 6 between points E and F shows the drop in temperature and the heat removed in de-superheating down to a temperature of 100° F. Curve 7, between points F and C, at a constant temperature of 100° F shows the heat removed in condensing the operating fluid.

From the curves of the closed loop 1 it is seen that the specific heat of the operating fluid as a vapor at the output of the turbine over the temperature range of 100° F (point F) to 200° F (point E) at a constant pressure of 72 psia is approximately 0.37, while the specific heat of the fluid as a liquid over the same temperature range at a pressure of 500 psia is approximately 0.52. Thus, the specific heat of the vapor is approximately 71% of the specific heat of the fluid as a liquid.

Curve 2 of FIG. 1 shows the temperature-enthalpy diagram of the heating fluid, where 1,000,000 pounds per hour of water at an initial temperature of 350° F is employed to heat the 796,000 pounds per hour of isobutane at a pressure of 500 psia. The water, as shown by curve 2 gives up 173,700,000 BTU's per hour while decreasing in temperature to 180° F.

Curve 3 of FIG. 1 shows the temperature-enthalpy diagram of the cooling fluid where 10,800,000 pounds per hour of water at an initial temperature of 80° F, which is essentially ambient temperature of water in a cooling tower, is employed to cool the isobutane after it has exhausted from the prime mover and reduced in pressure to 72 psia and is at a temperature of 200° F. The cooling fluid increases in temperature to 90° F in desuperheating and condensing the operating or working fluid.

Assuming an efficiency of 85% for the prime mover or power extracting gas expansion device, 26,800,000 BTU's per hour or 10,600 horsepower may be recovered from the geothermal heat through the medium of the heating fluid and the operating fluid in a closed system.

Figure 2:
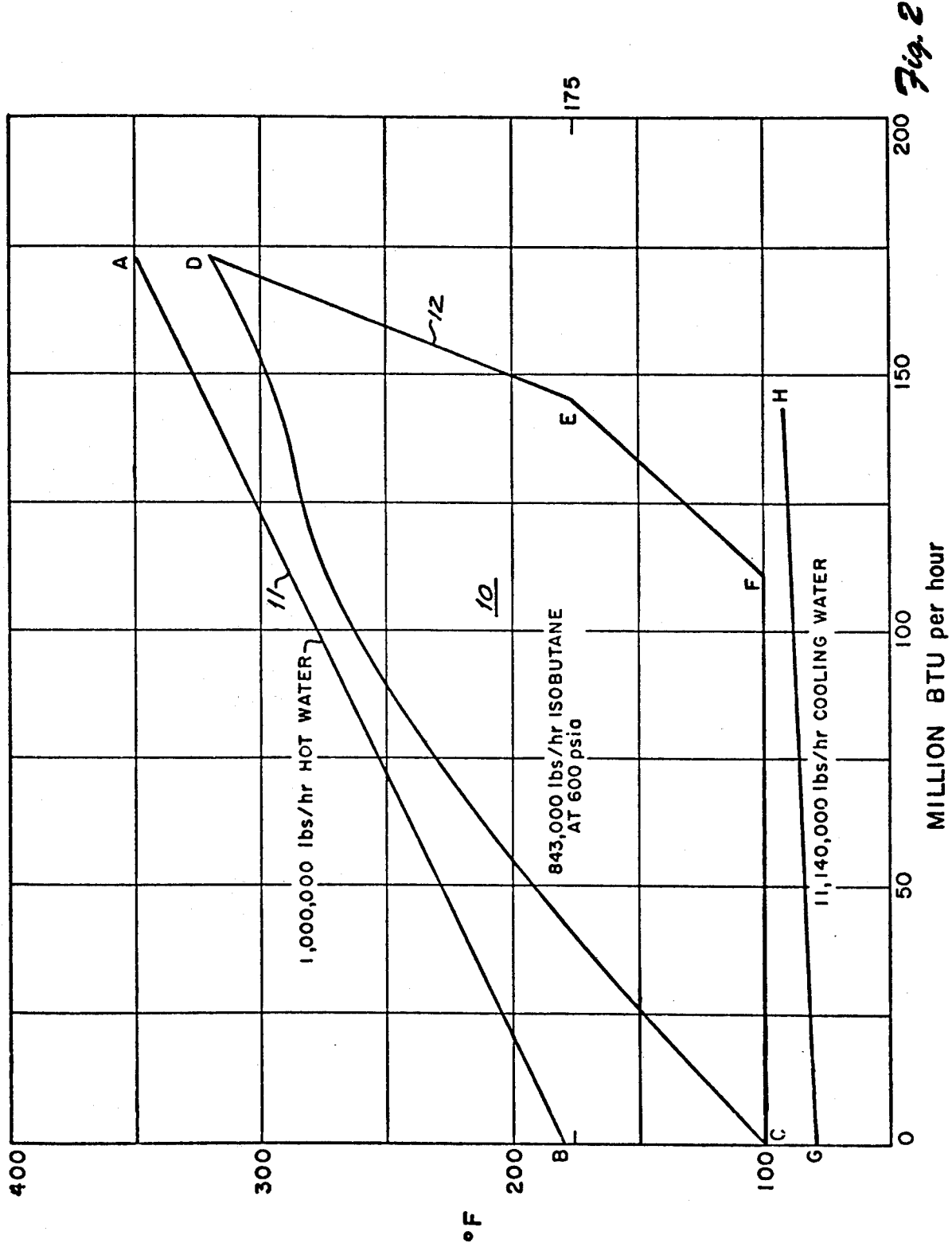
FIG. 2 is a temperature-enthalpy diagram for a heating fluid, an operating fluid at a selected pressure above its critical, and a cooling fluid of the heat recovery system in accordance with the present invention.

Advantageously, the process is carried out with the operating fluid being at a pressure in the heat exchangers that is above its critical. The same process and the same amount of hot water at the same temperature from a geothermal well as depicted in FIG. 1 with the operating fluid now being maintained above its critical pressure is shown in FIG. 2. Again using isobutane as the operating fluid, which is relatively non-corrosive and has a boiling point below that of the heating fluid, the isobutane is maintained at a pressure of 600 psia. At this pressure, the operating fluid is above its critical, which is 529 psia for isobutane, and the heat cycle or power cycle 10 depicted in FIG. 2 results. The 1,000,000 pounds per hour of water is cooled from 350° F to 180° F along curve 11 and gives up the same amount of heat to the operating fluid as shown in FIG. 1. Substantially more isobutane may be heated when operating above critical pressure. For example, this same amount of water starting at 350° F and cooling to 180° F heats 843,000 lbs/hour of isobutane at the pressure of 600 psia to the temperature of 320° F, where it is superheated vapor. On expanding this vapor through a turbine, which is a power extracting gas expansion device for extracting energy from the vapor, to a pressure of 72 psia, the temperature of the vapor reduces to 175° F, which is substantially below the 200° F in the heat cycle 1 of FIG. 1. This expansion takes place from points D to E in FIG. 2 along curve 12. The heat converted to power in the heat cycle shown in FIG. 2 is 28,500,000 BTU per hour which is 11,200 horsepower and a gain of 600 horsepower over the same operation at 500 psia. The specific heat of the vapor between 100° F and 200° F is approximately 0.36 while the specific heat of this liquid over the same temperature range is approximately 0.55. In this case the specific heat of the vapor is approximately 65.5% of the specific heat of the liquid.

It takes 11,140,000 pounds per hour of cooling water to desuperheat and condense the operating fluid after exhausting from the prime mover at a pressure of 72 psia and a temperature of 175° F under the conditions of FIG. 2.

In the processs represented by FIGS. 1 and 2, the cost of the condenser and the cooling water system are both high as the difference in temperature between the mean temperature of the cooling water and the temperature of the operating fluid during condensation is only about 12° F. To improve the effectiveness of the water to de-superheat and condense the vapor, a mixture of substances may be advantageously employed in place of a pure substance, such as isobutane. For example, a mixture of isobutane and isopentane in the molal ratio of 4 isobutane to 1 isopentane may be used.

Figure 3:
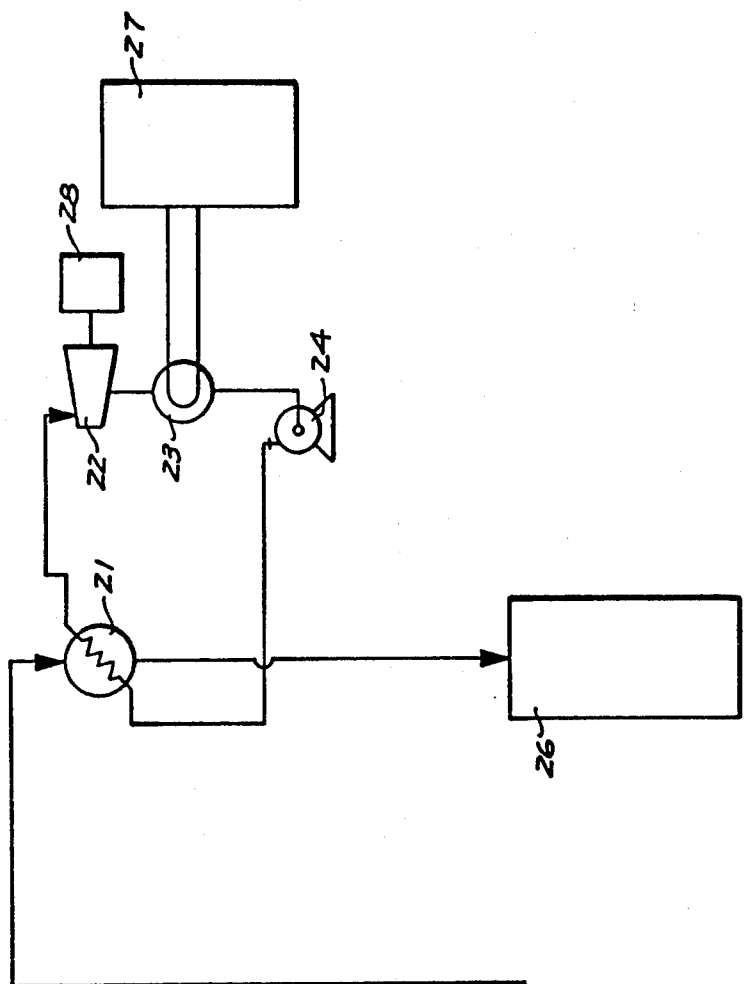
FIG. 3 is a process flow diagram of the heat recovery system in accordance with the method and apparatus of the present invention.

Apparatus for recovering heat from hot water extracted from a goethermal well is shown in block form in the process flow diagram of FIG. 3. The apparatus includes a system or loop 18 wherein an operating or working fluid is converted to a vapor in one or more heat exchangers which are represented by a heat exchanger 21. The fluid is given sufficient superheat to avoid condensation in a prime mover having at least 75% conversion efficiency, and expanded in a prime mover or power extracting gas expansion device, such as a turbine 22, which is coupled to the output of the heat exchanger 21. The operating fluid exhausts from the turbine 22 at a lower pressure and is applied to a condenser 23 for de-superheating and condensing. A pump 24 is connected between the condenser 23 and heat exchanger 21 for circulating the operating fluid in the system. The heat exchanger 21 may be a plurality of heat exchangers and so may the condenser 23 be a plurality of condensers. In any event, the hot fluid extracted from a geothermal well 25 is passed through the heat exchanger 21 in heat exchanger relationship with the operating fluid to transfer heat from the hot fluid to the operating fluid. Thereafter, the hot fluid may be returned to the earth, as representatively shown by the well 26 in FIG. 1, or may be further processed for the extraction of minerals in the hot fluid. The operating fluid may be cooled in the condenser 23 by the passage of water therethrough from a cooling tower 27 operating at atmospheric conditions. The turbine 22 drives a utilization means such as a generator 28 for converting the extracted heat to useful power. In areas where the subsurface pressure and/or temperature of hot water is too low for the hot fluid to flow from the wells naturally, it is necessary to install a deep well pump, such as pump 29 to bring the hot water to the surface.

Figure 4:
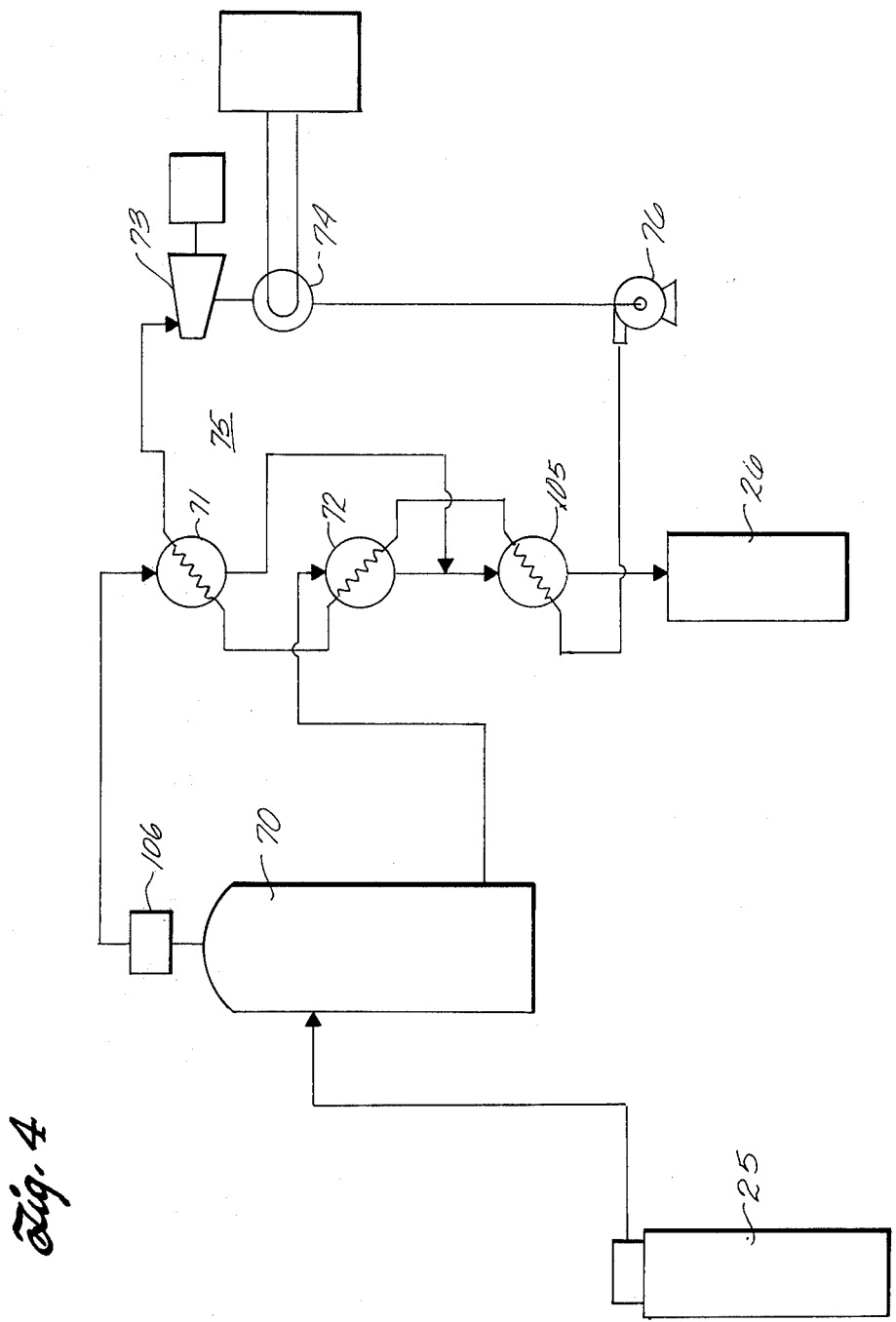
FIG. 4 is a process flow diagram of the fluids, including steam as part of the heating fluid, in a heat recovery system in accordance with the present invention.
Figure 5:
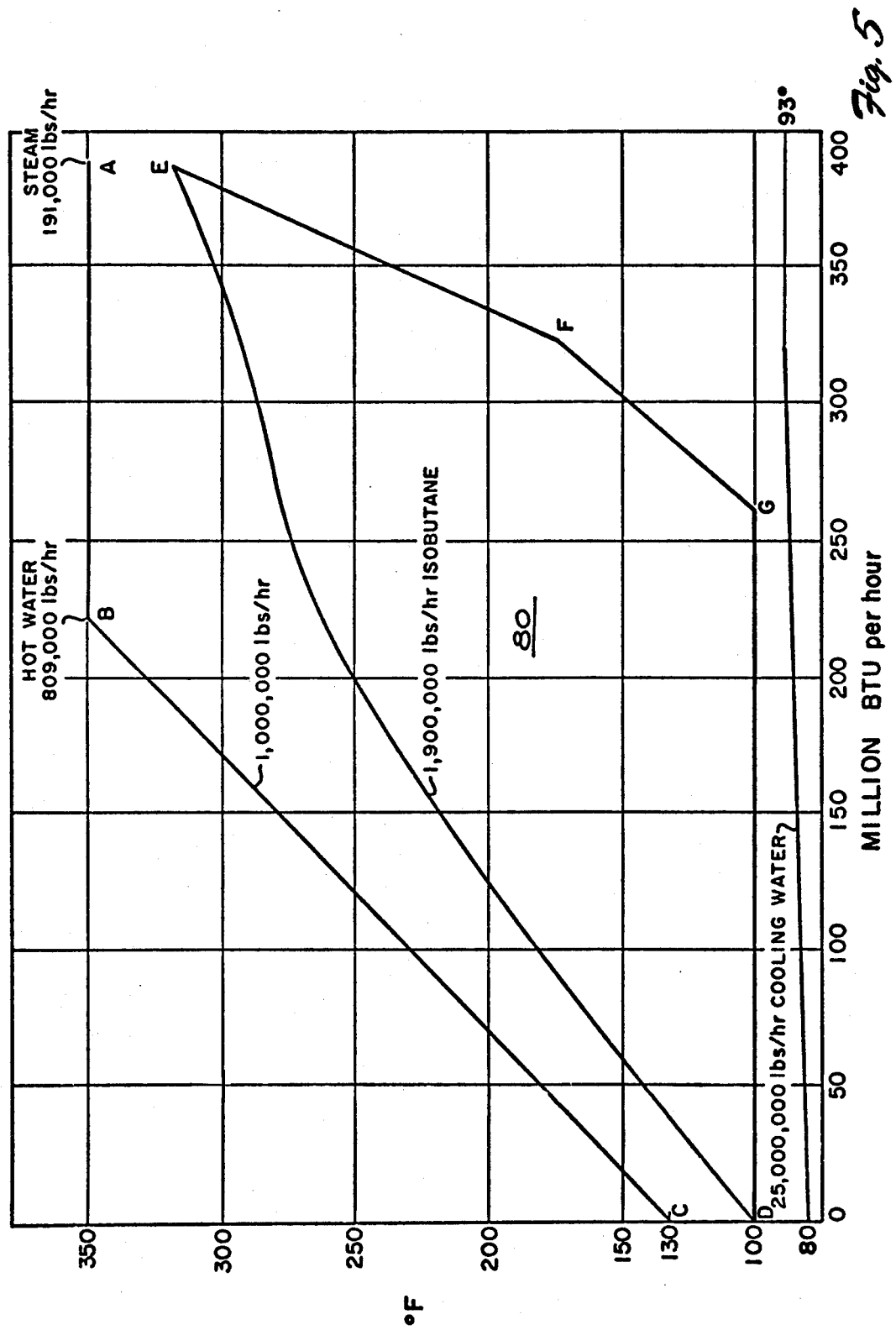
FIG. 5 is a temperature-enthalpy diagram for a heating fluid, a single substance operating fluid at a selected pressure above the critical, and a cooling fluid of the heat recovery system of FIG. 4 in accordance with the present invention.

In many locations, a combination of hot water and steam may be extracted from a geothermal well and in certain areas such as the Imperial Valley in California, hot water and steam will flow from 5,000-feet deep wells with a bottom hole temperature of approximately 700° F. A system for extracting energy from the combined water and steam from a geothermal well in accordance with this invention is depicted in FIG. 4. The system includes a separator or flash chamber 70 which may advantageously operate at 350° F and 120 psia. Under these conditions, the hot water and steam from the geothermal well flashes into approximately 19 percent steam and 81 percent hot water at 350° F. The separator or flash chamber 70 has two outputs, one for the steam and the other for the hot water. The steam output is coupled to a heat exchanger 71 and the hot water output is connected to a second heat exchanger 72 in a closed system 75. The closed system 75 includes in series flow the two heat exchangers 71 and 72 and a power extracting gas expansion device 73, a condenser 74, and a pump 76 for circulation of the operating fluid in the system. The heat cycle 80 for such a system is shown in the temperature-enthalpy diagram of FIG. 5 where a pure substance, such as isobutane, is employed as the operating fluid. The heat cycle 90, where a 80:20 molal mixture of isobutane and isopentane is employed as the operating fluid, is shown in FIG. 6.

Where a pure substance is employed, as depicted in FIG. 5, 1,000,000 lbs/hr. of hot water and steam from a geothermal well will generate 25,500 horsepower in the expansion device 73. Substantially the same amount of power is produced where a mixture is employed. However, the condensing and cooling system may be materially reduced in size and cost because of the greater mean temperature difference that results when a mixture is employed.

Figure 6:
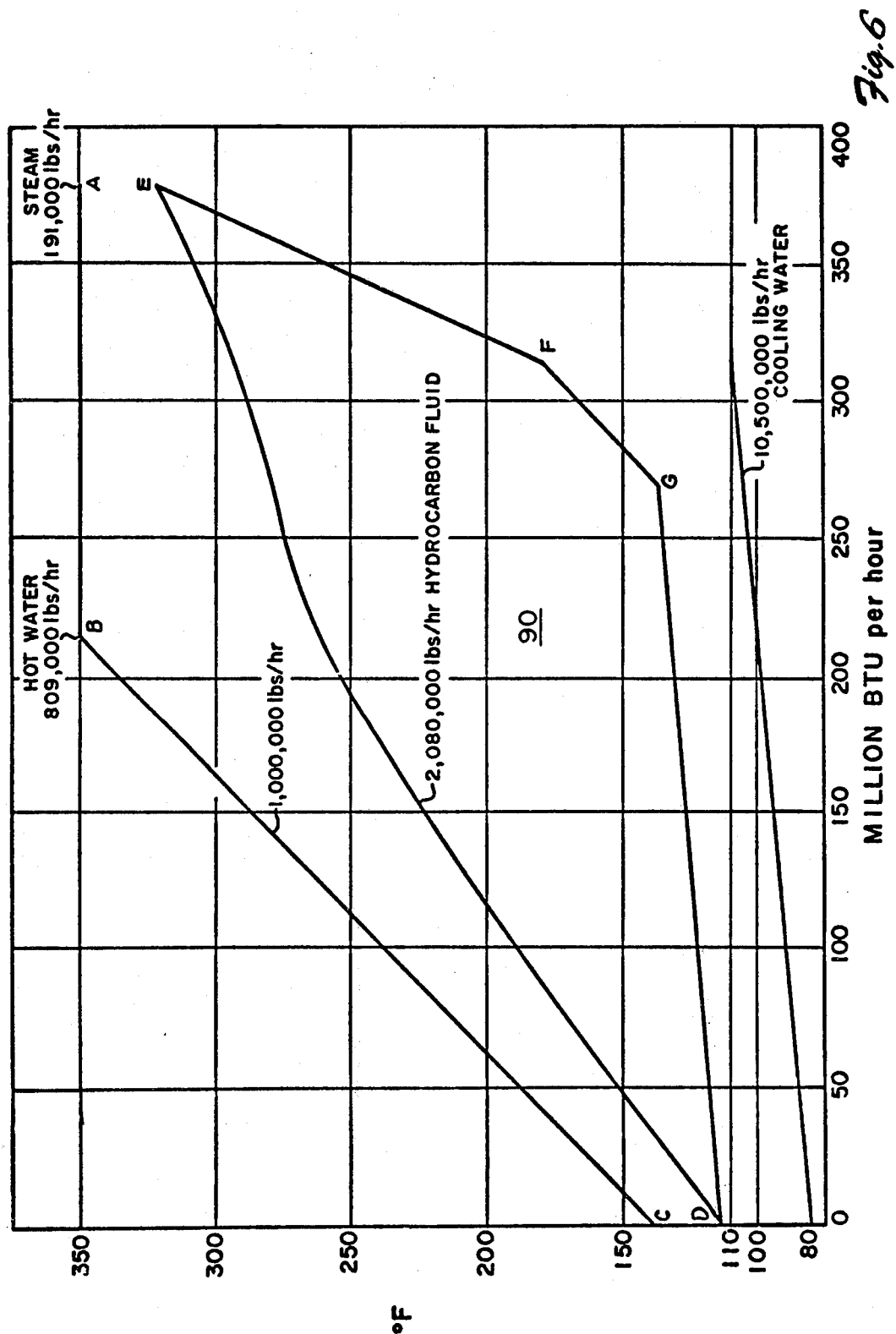
FIG. 6 is a temperature-enthalpy diagram for a heating fluid, an operating fluid of a mixture at a selected pressure above the critical of the mixture, and a cooling fluid of the heat recovery system of FIG. 4 in accordance with the present invention.

For example, 25,000,000 pounds per hour of cooling water increasing to 93° F from 80° F is required in condensing the operating fluid of FIG. 5, while only 10,500,000 pounds per hour of cooling water increasing in temperature from 80° F to 110° F is required in condensing the mixture of FIG. 6.

Figure 7:
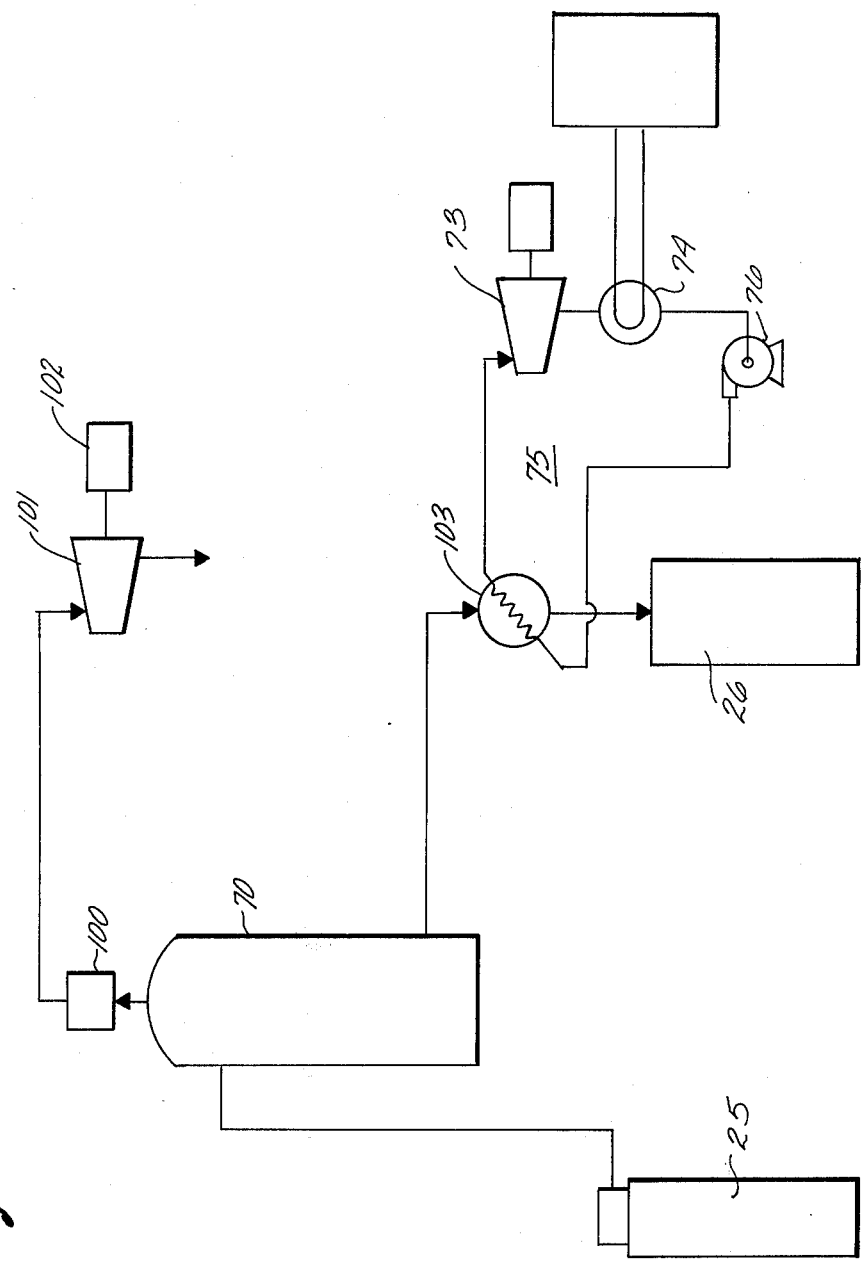

The heat energy may be recovered from the steam by applying the steam to a steam turbine as shown in the process flow diagram of FIG. 7. The steam is extracted from the flash chamber 70 and is passed through a scrubber or washer 100 to remove any entrained solids carried over by the steam. The clean steam at the output of the washer 100 is passed through a steam turbine 101 which drives a generator 102. The hot water is taken from the flash chamber 70 and passed through a heat exchanger 103 positioned in the closed system 75. The balance of the system 75 is the same as the system shown in FIG. 4 except for the omission of the heat exchanger 71 to which the steam was applied.

A further embodiment of the present invention wherein the heat energy is recovered from the steam as well as the hot water is shown in the process flow diagram of FIG. 8. The closed system 75 is enlarged to include at least one additional heat exchanger 105 to which the combined outputs of heat exchangers 71 and 72 are applied. Thus the heat remaining in the steam that passes through heat exchanger 71 and the hot water that passes through the heat exchanger 72 is used to preheat the operating fluid in the heat exchanger 105.

The steam is advantageously washed before application to the heat exchangers in washer 106 to remove the entrained solids therein.

Various modifications may be made in the properties of the fluids and the heat recovery system without departing from the spirit and scope of this invention.

What is claimed is:

1. A process for converting naturally occurring heat energy from within the earth carried by a hot fluid consisting of steam and water to mechanical energy comprising the steps of:
   flashing a portion of the fluid to steam;
   recovering the heat energy in the steam;
   passing the water in heat exchange relationship with an operating fluid having a critical temperature below the input temperature of the water;
   superheating the operating fluid with the heat from the water;
   expanding the operating fluid in a power extracting gas expansion device;
   condensing the operating fluid after extraction; and
   repeating the steps in a continuous process.

2. A process in accordance with claim 1 wherein the operating fluid has a specific heat as a vapor in the temperature range of 100° F. – 250° F. that is at least 50% of the specific heat as a liquid over the same temperature range under the operating pressures of the process.

3. The process in accordance with claim 2 comprising the further step of maintaining the pressure of the operating fluid at the input to the gas expansion device above the critical pressure of the operating fluid.

4. The process in accordance with claim 1 wherein the steam is passed through a steam turbine.

5. The process in accordance with claim 1 wherein the steam is passed in heat exchange relationship with the operating fluid.

6. The process in accordance with claim 5 comprising the further step of combining the steam after passing in heat exchange relationship with the operating fluid with the water and passing the combination in heat exchange relationship with the operating fluid.

* * * * *